United States Patent [19]
Fréchet et al.

[11] Patent Number: 5,849,828
[45] Date of Patent: Dec. 15, 1998

[54] METALATION AND FUNCTIONALIZATION OF POLYMERS AND COPOLYMERS

[75] Inventors: Jean M. J. Fréchet, Ithica, N.Y.; Shah A. Haque, Houston, Tex.; Joachim Hans Georg Steinke, Cambridge, United Kingdom; Hsien-Chang Wang, Bellaire, Tex.

[73] Assignees: Exxon Chemical Patents Inc, Houston, Tex.; Cornell Research Foundation, Inc, N.Y.

[21] Appl. No.: 869,818

[22] Filed: Jun. 5, 1997

Related U.S. Application Data

[60] Division of Ser. No. 476,753, Jun. 7, 1995, Pat. No. 5,670,581, which is a continuation-in-part of Ser. No. 447,131, May 22, 1995, abandoned, which is a continuation-in-part of Ser. No. 444,950, May 19, 1995, abandoned.

[51] Int. Cl.$^6$ ....................................................... C08F 8/42
[52] U.S. Cl. ...................... 525/342; 525/333.3; 525/354; 525/359.1; 525/359.3; 525/359.5; 525/359.6; 525/383; 525/385; 525/386
[58] Field of Search ...................................... 525/342, 354, 525/359.1, 359.3, 359.5, 359.6, 383, 385, 386

[56] References Cited

U.S. PATENT DOCUMENTS

| | | | |
|---|---|---|---|
| 3,978,161 | 8/1976 | Nielsen et al. | 260/877 |
| 4,145,490 | 3/1979 | Harris, Jr. et al. | |
| 5,162,445 | 11/1992 | Powers et al. | |

FOREIGN PATENT DOCUMENTS

| | | |
|---|---|---|
| 0179969 | 5/1986 | European Pat. Off. |
| 0189672 | 8/1986 | European Pat. Off. |
| 1911886 | 11/1969 | Germany. |
| 1905331 | 6/1971 | Germany. |
| WO 91/04993 | 4/1981 | WIPO. |
| WO 94/22950 | 10/1994 | WIPO. |
| WO 95/10544 | 4/1995 | WIPO. |

OTHER PUBLICATIONS

Harris, Jr. et al., "Block and Graft Copolymers of Pivaloactone. 5. Graft Copolymers from Pivalolactone and Isobutylene", *Macromolecules*, 19, 2903–8, (1986).

Lochmann et al., "Preparation of Organopotassium Compounds", *J. Organometallic Chemistry*, 28, 153–158 (1971).

L. Lochmann et al., "Lithium–Potassium Exchange in Alkyllithium–Potassium t–Pentoxide Systems", *J. Organometallic Chemistry*, 326, 1–7 (1987).

L. Lochmann et al., "More Efficient Metallation of Alkylbenzenes by Modified Superbases from Butyllithium and Potassium Alkoxides Structure and Concentration", *Tetrahedron Letters*, 32 (11), 1483–83 (1991).

Lochmann et al., "Globular polyethers with Internal functionalization by Metalation of Dendrimers and Reaction with Electrophiles", *Polym. Mat. Sci. Eng.*, 69, 426–7 (1993).

L. Lochmann, et al., A Novel Approach to Graft Copolymers via the Metalation of Polystyrene by Superbase and Reaction with Electropiles., *Polymer Preprints*, 34(2), 588–9 (1993).

*Primary Examiner*—Bernard Lipman
*Attorney, Agent, or Firm*—Myron B. Kurtzman

[57] ABSTRACT

There is provided a method of introducing functionality into a copolymer of an isoolefin and an alkylstyrene at the alkylbenzyl carbon atom comprising the steps of: forming a solution of said copolymer in a hydrocarbon solvent; adding to said polymer solution an alkali metal Cs, K, Na alkoxide and an alkyl lithium compound to form a superbase with the polymer solution; and adding an electrophile to said base polymer solution also provided are the metalated copolymers and the functionalized derivative therefrom.

12 Claims, No Drawings

METALATION AND FUNCTIONALIZATION OF POLYMERS AND COPOLYMERS

This is a divisional of application Ser. No. 08/476,753, filed 7 Jun. 1995 now U.S. Pat. No. 5,670,581 which is a Continuation-in-Part of Title: "Metalation and Functionalization of Polymers and Copolymers" Inventors: Jean M. J. Frechet, Shah Haque, Joachim Steinke, and Hsien Wang, U.S. Ser. No. 08/447,131, filed May 22, 1995 abandoned which is a Continuation-in-Part of U.S. Ser. No. 08/444,950, filed May 19, 1995 abandoned.

FIELD OF THE INVENTION

This invention relates to copolymers containing alkyl styrene comonomers which are metallated using a superbase to provide a metallated copolymer which may be functionalized by addition thereto of an electrophilic reagent.

BACKGROUND OF THE INVENTION

Heretofore, butyl rubbers, i.e., copolymers of isobutylene and small amounts of isoprene as a comonomer, and/or halobutyl rubbers, i.e., a halogenated derivative of a butyl rubber, have been used as an elastomer for forming blend compositions with thermoplastic compounds and other elastomer compounds for use in tire production and the like. The butyl and/or halobutyl rubbers impart a number of desirable physical properties to such blends, such as low air permeability, relatively low glass transition temperature (Tg), broad damping peaks, environmental aging resistance, etc. that are significant in the production of tires of superior performance properties. However, various difficulties are encountered with the use of the butyl and/or halobutyl rubbers for this purpose, chief among which is their high incompatibility with most other polymers, including even unsaturated elastomeric compounds to which they have weak adhesion. Hence, that aspect of a butyl rubber that provides properties which make it desirable as a component in blends for tire production, namely the chemical "inertness" that results from the unreactiveness of the hydrocarbon backbone of the butyl rubber polymer, also results in its low reactivity and incompatibility with most other materials and this has limited its use in many areas.

Recently, in U.S. Pat. No. 5,162,445 a unique copolymer of isobutylene has been disclosed together with a procedure for introducing non-backbone functionalities into this copolymer, which well suits it to use as a blend component having all the property advantages of a butyl and/or halobutyl rubber, but which overcomes the incompatibility disadvantage of a butyl and/or halobutyl rubber. In its broadest description, the new copolymer is a direct reaction product of an isoolefin having from 4 to 7 carbon atoms with a para-alkylstyrene; isobutylene and para-methylstyrene being the preferred monomers; wherein the copolymer has a substantially homogeneous compositional distribution. Derivatives of this IB-PAS copolymer having functionalities that render it compatible and/or cross-linkable with other polymer materials, both thermoplastic and elastomeric polymers, are produced through a halogenated intermediate that is produced by a free radical initiated halogenation of the IB-PAS copolymer.

In U.S. Pat. No. 5,162,445 a preferred copolymer is that of isobutylene and para-methylstyrene and this copolymer is brominated to provide a copolymer having a portion of its para-methylstyrene content brominated at the para-methyl group. The brominated copolymer being essentially a high molecular weight, narrow molecular weight distribution polymer of isobutylene-para-methylstyrene-para-bromomethylstyrene. The benzylic bromine atoms are highly reactive under mild conditions in the presence of a nucleophilic reagent. It was found that a wide variety of functional groups could be introduced at the site of the brominated para-methyl carbon atoms of the pendant phenyl groups to displace at least a portion of the bromine atoms without disruption of the backbone structure or altering the molecular weight and/or molecular weight distribution characteristics of the backbone of this copolymer.

Heretofore, styrenic polymers have reportedly been metallated with lithium by reaction with an alkyl lithium compound activated with N,N,N',N'-tetramethyl ethylene diamine (TMEDA), and the metalated derivative then converted by reaction with an electrophilic reagent to a variety of functionalized derivatives. Harris et al. U.S. Pat. No. 4,145,490 and *Macromolecules* 19 2903–08 (1986) describes the metalation of copolymers of isobutylene with styrene and/or a methylated styrene with lithium as a means of introducing functionality into the copolymer to prepare it for polymerization with pivalolactone. The procedure described by Harris et al. apparently results in introducing functionality into both the primary and tertiary benzylic carbon atoms of a methylated styrene comonomer unit, as well as the aromatic ring carbon atoms thereof. Huge excess of the reagent (alkyl-Li/TMEDA) is required, incomplete metalation of p-methyl group of styrene unit, and long reaction time are some of the disadvantages associated with the Harris et al. procedure. Hence, it appears that the possible advantage of following the Harris et al. procedure as a means for introducing functionality into the new IB-PAS copolymers disclosed by U.S. Pat. No. 5,162,445 would be achieved at the significant disadvantage of disrupting the hydrocarbon nature of the backbone chain of this copolymer by also introducing lithium at the tertiary benzylic carbon atoms of the copolymer backbone.

Reports have also appeared concerning the combination of an alkyl lithium compound with an alkoxide of a heavier alkali metal to form a reagent, which has been referred to as a "superbase," which is very reactive for performing metalation reactions in organic synthesis and polymer chemistry. The application of a superbase reagent formed from an alkyl lithium and a potassium alkoxide to the metalation of aromatic hydrocarbons like benzene, toluene, ethylbenzene, and cumene to form a metallated species in which the counterion is the heavier alkali metal rather than lithium have been described in articles like *J. Organometallic Chemistry*, 153–158 (1971); *J. Organometallic Chemistry* 326, 1–7 (1987); *Tetrahedron Letters*, 32 (11), 1483–86 (1991).

Even with respect to such simple aromatic molecules, a variety of intermediate metallated products, as deduced from the product resulting from the reaction of the metallated intermediate with methyl iodide, have been reported. In addition to the products whose structures were not determined, the other products of the alkyl Li/K alkoxide superbase metalation reaction comprise structures wherein both an alkyl side chain carbon atom and/or an aromatic ring carbon atom are metallated.

Lochmann et al. in *Polym. Mat. Sci. Eng.*, 69, 426–7 (1993) and *Polymer Preprints*, 34(2) 588–9 (1993) have described the metalation of homopolystyrene and a dendritic polyether with an alkyl Li/potassium tert-pentoxide superbase reagent as a means for introducing functionalities whereby the functionalized polymer materials may then be converted to graft copolymers or multi-functionalized dendrimers of significantly altered properties. It is again reported that main chain metalation—i.e., metalation of the tertiary benzylic carbon atom of the polymer backbone chain—occurs to an even greater extent with an alkyl lithium/potassium tert-pentoxide superbase reagent than that which occurs with an alkyl lithium/TMEDA reagent like that used previously by Harris et al. The metalation of such backbone carbon atoms would disrupt the hydrocarbon nature of the polymer backbone of the new copolymer materials described by U.S. Pat. No. 5,162,445 with potential adverse effects upon its chemical inertness. Further, a significant degree of metalation at aromatic ring carbon atoms is also reported to occur with the alkyl lithium/potassium tert-pentoxide superbase reagent.

It is desirable to devise a way by which to convert the new copolymer materials into functionalized derivatives without altering the inert hydrocarbon structure of the backbone of the copolymer.

SUMMARY OF THE INVENTION

This invention provides a method by which an isobutylene-para-alkylstyrene copolymer, as described in U.S. Pat. No. 5,162,445, may be functionalized at the benzylic carbon site of the para-alkyl group of the styrenic comonomer without significantly altering the backbone micro-structure of the copolymer, molecular weight or molecular weight distribution or the nature of the aromatic ring carbons of the aromatic group pendant to that copolymer backbone. The method comprises treating the isobutylene-para-alkylstyrene copolymer while in solution in a hydrocarbon solvent to the action of a superbase. The superbase formed by the interaction of an alkyl lithium compound with a higher atomic weight alkali metal alkoxide to form a metallated species wherein the counterion is the higher atomic weight alkali metal (Na, K, Cs) which is localized to the para-alkyl carbon site of the styrenic comonomer. It has been found that the desired metallated polymer species is formed very quickly, in a matter of minutes, making it possible to produce the desired metallated polymer species by a continuous flow reaction procedure. The metallated copolymer may be contacted with an electrophilic reagent to convert the metallated copolymer into a derivative having the functional group carried by the electrophilic reagent covalently bonded to the benzylic carbon atom of the para-alkyl group of the aromatic group pendant to the copolymer backbone.

The conditions of the metalation reaction of the copolymer in terms of the mole ratio of the alkyl lithium compound to the mole content of the para-alkylstyrene units of the copolymer, the mole ratio of the heavier alkali metal alkoxide to the alkyl lithium compound and the temperature of the metalation reaction are all selected to minimize the occurrence of metalation reaction at aromatic ring carbon atom sites while maximizing metalation at the primary benzylic carbon atom sites.

It has been found that the tertiary benzylic carbon atom of the copolymer is not metallated (and thereafter functionalized) under the selected reaction conditions and therefore the initial microstructure of the copolymer backbone is preserved intact in the functionalized derivatives thereof which result as a product of the practice of this method. Further, it has been found that by proper selection of the foregoing conditions, coupled with the choice of the superbase (Na, K or Cs), that the metalation of aromatic ring carbon sites can be reduced to an amount which is insignificant and/or essentially eliminated, thus reducing or eliminating the introduction of functionalities at these sites in the final product. Still further, it has been found that, with reference to the para-alkylstyrene content of the copolymer, the degree of metalation and hence functionalization can be accomplished to any extent desired, up to essentially one hundred percent if desired. It has been found that the metalation reaction can be carried to its optimum extent in terms of completeness and specificity for reaction with the metallated benzylic site compared to aromatic metallated sites in a relatively brief period, generally less than 10 minutes, and without need for use of a substantial excess of the superbase reagents. In addition to permitting production of the metallated copolymer by a continuous flow reaction process, this also permits use of smaller quantities of nucleophilic reagents for the treatment in situ of the metallated copolymer to convert it to a functionalized copolymer product. Also, since the functionality incorporated into the copolymer via the metallated copolymer is introduced through the use of electrophilic reagents, it is now possible to introduce certain types of functional groups into the isobutylene-para-alkylstyrene copolymer which are not possible of introduction through the bromination-nucleophilic reagent procedure as described in U.S. Pat. No. 5,162,445.

Accordingly, there is provided a method of metallating a copolymer of an isoolefin and an alkylstyrene at the alkylbenzyl carbon atom, the method comprising the steps of: forming a solution of said copolymer in a hydrocarbon solvent; adding to said polymer solution an alkali metal alkoxide and an alkyl lithium compound to form a superbase with the polymer solution; and recovering the metallated copolymer. In accordance with this invention, there is also provided a method of introducing functionality into a copolymer of an isoolefin and a para-alkylstyrene at the alkylbenzyl carbon atom, the process comprising the steps of: forming a solution of said copolymer in a hydrocarbon solvent; adding to said polymer solution an alkali metal alkoxide and an alkyl lithium compound to form a superbase with the polymer solution; adding an electrophile to said base polymer solution; and recovering the functionalized copolymer. There is also provided novel random copolymers represented by the emperical formula:

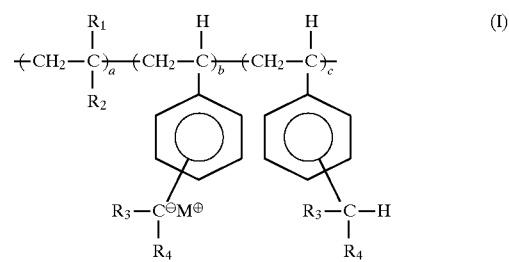

wherein "a" is in the range of 1 to 70,000, "b" is in the range of 1 to 7,000, and "c" is in the range of 0 to 7,000, $R_1$ and $R_2$ are each independently $C_1$–$C_5$ alkyl or hydrogen, provided that at least one of $R_1$ and $R_2$ is alkyl and $R_1+R_2$ is $\leq 5$ carbon atoms; $R_3$ and $R_4$ are each independently one of hydrogen, a $C_1$–$C_4$ alkyl group, and M is an alkali metal other than lithium. Preferably the alkali metal is one of sodium, potassium, or cesium. Also preferably the alkylstyrene is para-alkylstryene. In another aspect of this invention, the metallated copolymer is contacted with an electrophile to provide an electrophiled alkylstryrene.

Also provided is the functionalized derivative of I. These functionalized polymers comprise the product resulting from reaction of a copolymer of a monoisoolefin and an alkyl styrene with a superbase and an electrophilic reagent. The copolymers are represented by the formula:

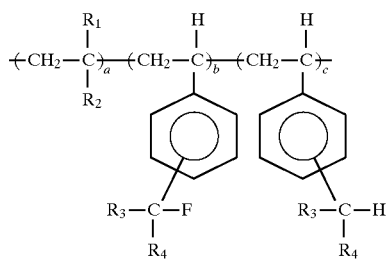

wherein "a" is in the range of 1 to 70,000, "b" in the range of 1 to 7,000, and "c" in the range of 0 to 7,000, $R_1$ and $R_2$ are each independently a $C_1$ to $C_5$ alkyl or hydrogen, provided that at least one of $R_1$ and $R_2$ is alkyl and $R_1+R_2 \leq 5$ carbon atoms; $R_3-R_4$ are each independently one of hydrogen, a $C_1$ to $C_4$ alkyl group fragment and F is an electrophile.

DESCRIPTION OF THE PREFERRED EMBODIMENTS

The monoisoolefin-para-alkylstyrene copolymers that are suitable for the metalation-functionalization process of the method of this invention are those as described in U.S. Pat. No. 5,162,445, the disclosure of which is hereby incorporated by reference as if fully set forth and described herein. Those copolymers of particular interest and hence the preferred copolymers are those of isobutylene (IB) and para-alkylstyrene (PAS) and particularly those of isobutylene and para-methylstyrene (PMS), which may hereafter be referred to as an IB-PMS copolymer. Of these IB-PMS copolymers, the most preferred are the IB-PMS copolymers that exhibit elastomeric properties, these generally having a weight percent content of IB-PMS monomeric units of from about 99.5 to about 50 and a PMS monomeric content of from about 0.5 to about 50 weight percent. Generally, the elastomeric IB-PMS copolymers have a number average molecular weight ($M_n$) of 500 or greater, preferably of 25,000 or greater, ranging up to about 2,000,000 and their molecular weight distribution is less than 6.0, preferably less than 4.0, and most preferably less than 2.5.

The IB-PMS elastomeric copolymers, when functionalized in accordance with this invention, are especially useful and desired as compounded rubber compositions and as blending components for the formulation of blend compositions with other thermoplastic and/or elastomeric polymers used in the production of carcass, side wall, tread and other components of pneumatic tires having superior performance properties.

The Superbase Metalation Reagent

That reagent used to treat the IB-PMS copolymer to form its metalated counterpart is the product obtained by reaction of an alkyl lithium compound (AkLi) and a heavier alkali metal alkoxide (AkOM) while both are in a neutral, non-polar solvent such as a hydrocarbon solvent.

The Alkyl Lithium Compound

One criterion for the selection of the alkyl lithium compound used to form the superbase is to select one wherein the alkane analogue of the alkyl lithium compound would have a pK value that is greater than the pK value of the H-bond of a benzylic carbon atom.

The Alkali Metal Alkoxide Compound

The heavier alkali metal alkoxide reagent may be prepared by reacting sodium (Na), potassium (K), rubidium (Rb) or cesium (Cs) metal with an alkanol in a nonpolar solvent. The alkoxy structure (AkO) of the alkali metal alkoxide reagent then corresponds to the alkanol (AkOH) from which it was prepared. Among the alkali metal alkoxide reagents that are suitable for practice of this invention are those resulting from the reaction of an alkali metal with isopropanol, sec-butanol, tert-butanol, 2-pentanol, 3-pentanol, tertpentenol, 3-methyl 3-pentanol, 2-hexanol, 3-hexanol, 2-methyl 2-hexanol, 2-heptanol, 3-heptanol, 4-1 (−)menthol heptanol, 3-methyl 3-hexanol, 2-ethyl 2-hexanol, 3-ethyl 3-hexanol, 2-propyl 2-pentanol, 2-isopropyl 2-pentanol, 3-propyl 3-pentanol, 3-isopropyl 3-pentanol, methanol, and the like. Generally, for purposes of convenience of workup and recovery of the by-products of the functionalization reaction, it is preferred to use an alkali metal alkoxide reagent the alkynol precursor of which has a boiling point of 200° C. or less at 1 atmosphere. The alkali metal alkoxide reagents most preferred are the alkali metal reaction products of 2-ethyl 2-hexanol (2EtHexOH), menthol (MenOH), tertiary pentanol (t-PeOH).

Superbase Formation

Solvents which may be employed for the formation of the alkyl lithium, alkali metal alkoxide, and/or the super base which results from the interaction therebetween are neutral non-polar liquids, such as, and preferably, hydrocarbon solvents that have boiling points from about 0° C. to about 200° C. When appropriate, higher or lower temperatures can be employed. The hydrocarbon solvent may be an aliphatic or cycloaliphatic hydrocarbon and preferably is a hydrocarbon in which the IB-PMS copolymer is soluble to at least the extent of about 2 wt. %. Among the suitable solvents, preferred solvents include pentane, n-hexane, heptane, octane, decane, cyclohexane, methylcyclohexane, and the like.

The superbase reagent may be formed separate from the polymer solution to which it is later added or it may be formed in situ in the polymer solution by adding the alkyl lithium and alkali metal alkoxide compounds to the polymer solution. When formed in situ in the polymer solution it is preferred to first add the alkali metal alkoxide and thereafter to add the alkyl lithium compound. The molar amount of the superbase will be equal to the molar amount of alkyl lithium employed in its preparation.

Reaction Conditions for Metalation

With respect to the extent that the alkyl benzylic carbon atom as compared to the aromatic ring carbon atoms of the styrenic unit of the IB-PAS copolymer are metallated, the following reaction parameters have been observed to exert a significant influence on the course and nature of the reaction: (1) the mole ratio of the superbase compound to the styrenic comonomer content of the copolymer; (2) the mole ratio of the alkyl lithium compound to the alkali metal alkoxide compound used to prepare the superbase; (3) the nature of the alkali metal atom (M used for the superbase; (4) the temperature of the polymer solution during the metalation reaction; (5) the nature of the alkyl moiety of the alkyl lithium compound selected for preparation of the superbase; and (6) the mixing conditions under which the metalation reaction is carried out. With proper choice of conditions the metalation reaction may proceed to the extent of essentially total metalation of the styrenic content of the copolymer. Reaction of the tertiary benzylic carbon atom—i.e., the benzylic atom in the polymer backbone chain—either does not occur or occurs to such a small extent as to not be detectable by standard NMR analysis methods.

The mole ratio of superbase to para-alkylstyrene copolymer can range from about 1 to about 2, with 2.0 being preferred. Amounts of alkyl lithium in a mole ratio to the styrenic comonomer content of greater than 2.0 may be employed. Generally, amounts of the superbase that exceed the 2:1 ratio may not be desirable since such amounts would increase the amount of nucleophilic reagent needed to treat the in situ metallated copolymer to convert it to a functionalized product. The amount of alkali metal alkoxide used in preparing the superbase reagent may range as a mole ratio to the amount of alkyl lithium used from about 1 to about 5, preferably from about 1.1 to about 3.0, and more preferably at or about 3.0. Generally, it is preferred to employ an excess of alkali metal alkoxide relative to the alkyl lithium, with a mole ratio of alkali metal alkoxide to alkyl lithium of about 3:1 being preferred for the preparation of the superbase. Within these ranges the greater degree of metalation with the greatest degree of specificity for metallating the benzylic carbon of the para-alkyl group of the styrenic comonomer in comparison to aromatic carbon sites occurs wherein the mole ratios of AkLi/AkOM/styrenic comonomer content is on the order of 2/6/1.

Further, when the alkyl lithium and alkali metal alkoxide compounds are employed in the amounts as preferred the greatest degree of metalation of the benzylic carbon site of the para-alkyl group of the styrenic comonomer with the greatest degree of specificity compared to aromatic carbon sites occurs when the alkali metal of the alkali metal alkoxide reagent is cesium (Cs), next to which is potassium (K), and least preferred is sodium (Na). Further, within the context of the preferred Cs and K alkoxides, the greatest degree of specific metalation of the benzylic carbon site of the para-alkyl group of the styrenic comonomer unit is realized when the alkyl lithium reagent is one wherein the Li atom is associated to a secondary carbon atom of the alkyl moiety rather than a tertiary carbon atom.

Preferred superbase systems for metalation of an isobutylene-para-allylstyrene copolymer are those of s-butyl lithium and either t-PeOK or MenOCs. The most preferred is MenOCs. Within this metalation system the metalation reaction proceeds over a broad temperature range which extends from just above the freezing point of the solvent utilized to just below the boiling point of the solvent. The extent and specificity to which the metalation reaction proceeds does not appear to be dramatically affected by the temperature at which it is conducted. The metalation reaction is preferably conducted at a temperature between 15° and 85° C., desirably 20°–70°, more preferably at about ambient temperature—i.e., about 20°–25° C.

The metalation reaction proceeds relatively quickly, with times typically ranging on the order of minutes, as like from about 2 to 30 minutes, and preferably about 15 minutes, being the time within which the reaction proceeds to the optimum extent. Reaction times longer than 60 minutes are not required and may in some instances degrade the quality of the resulting product from the optimum that is otherwise achieved by a shorter reaction time.

Functionalization of the Metallated Product

An electrophilic reagent, neat or in solution, may be added to the solution containing the metallated isobutylene-para-alkyllstyrene copolymer to convert it to a derivative product.

An electrophilic reagent with (FMo) is a molecule that contains an electron deficient atom or group (F) which will react with the electron rich atom of nucleophile. The moiety of the electrophilic reagent may comprise any molecular arrangement (Mo) including any number of functional groups (F). The electron deficient atom of the electrophilic reagent reacts with the metallated carbon atoms of the metallated copolymer, these being essentially the metallated benzylic carbon atom of the para-alkyl group of the styrenic comonomer, which are electron rich and capable of donating a pair of electrons. The reaction, wherein P represents the polymer chain, may thus be represented as:

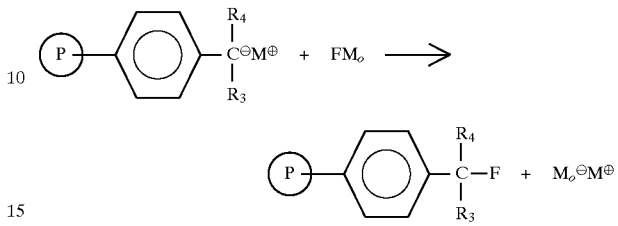

The electrophilic reagent adds to the benzylic carbon atoms of the para-alkyl group to itself form the functional group of the product composition—as in the case of carbon dioxide to form a carboxylic acid functional group or dimethylcarbonate to form a methyl carboxylate functional group—or carry a preexisting functional group into the product composition—as in the case of 3-bromo-1-propene to form a 4-butylene pendant group.

The electrophilic reagents that are suitable include organic or inorganic compounds. Illustrative of the organic classes of Lewis acids that are suitable as electrophilic reagents are compounds bearing a carboryl carbon atom such as aldehydes, ketones, esters; compound containing a halogen atom such as the organic halides, acyl chloride (acrylyl chloride, methacrylyl chloride), trialkylsilyl halides (bromides and chlorides), trimethylsilyl chloride, sulfonyl chloride, benzyl halides, aliphatic, or silylic halides; enones, fluoroaromatic compounds substituted with electron withdrawing groups such as para-fluoro-nitrobenzyne and para-fluoro-benzophenone; compounds containing epoxide functionality such as ethylene oxide; and $CO_2$.

The composition resulting from reaction of a metallated copolymer of a monoisoolefin and a para-alkylstyrene is in effect a new copolymer or terpolymer, depending upon the extent that the copolymer of monoisoolefin and para-alkylstyrene was metallated prior to its reaction with the electrophilic reagent. Wherein the copolymer was metallated to less than the full extent of its para-alkystyrene comonomer content, then the product resulting from its reaction with an electrophilic reagent is a terpolymer of monoisoolefin-para-alkylstyrene-para-functionalized alkylstyrene, wherein the term "para-functionalized alkyl styrene" is intended to mean the comonomer composition which results from the reaction of a metallated para-alkylstyrene comonomer with an electrophilic reagent. Although we have described the invention with regard to the alkylstyrene being p-alkyl, the m-alkyl, the o-alkyl can also be employed.

These polymers are used in tires, production of polymer blend, in production of engineering plastic blends, in the formation of air barriers and in the production of adhesive and sealant materials, coatings, and mechanically molded goods.

EXAMPLES

General Procedure A:

Metalation of Isobutylene-para-methylstyrene Copolymer

Purified and dried isobutylene-para-methylstyrene copolymer is dissolved in a hydrocarbon solvent, preferably cyclohexane (c-hexane) or hexane (n-hexane), and the homogeneous solution is stirred. The concentration of polymer in this solution is 5% (w/v). Before addition of an alkali metal alkoxide (an approximately 1 molar solution of alkali metal alkoxide in hexane or cyclohexane) the solution is cooled down or heated up to a temperature as indicated in Tables 1 and 2. After addition of the alkali metal alkoxide, the alkyl lithium component, which unless otherwise indicated is an approximately 1.3 molar solution of s-BuLi in hexane, is added also. The color of the solution changes almost instantaneously from colorless to yellow, orange, red or deep dark red depending on the choice of alkoxide and the molar quantities of reagents (alkali metal alkoxide and alkyl lithium) used. The formation of superbase (SB) is allowed to proceed for usually 15 minutes. Addition of an excess of a suitably chosen electrophile (neat or in solution), like trimethylsilylchloride (TMSCl), leads to a clear and almost colorless solution. Stirring continues for at least an hour before work-up.

General Procedure B:

Work-up of Functionalized Isobutylene-para-methylstyrene Copolymer

The organic phase, containing the metal functionalized polymer is extracted with 10% aqueous HCl (twice), 1N aqueous NaOH (twice), saturated aqueous sodium bicarbonate solution (twice), and finally with water. The organic layer is separated from the aqueous one. Precipitation into acetone, isopropanol or methanol (depending on the solubility characteristics of the functionalized polymer) affords the desired polymer product. The organic liquid is decanted and the remaining polymer is washed several times using methanol. Finally the polymer is dried at room temperature or a somewhat elevated temperature (60° C.) under vacuum.

General Procedure C:

Time-Dependent Studies on the Metalation of Isobutylene-para-methylsytrene

Purified and dried isobutylene-para-methylsytrene is dissolved, preferably in a hydrocarbon solvent such as hexane or cyclohexane. Addition of a metal alkoxide follows under continued stirring. Afterwards the solution is cooled down or warmed up as indicated in Tables 1 and 2. An alkyl lithium compound is added quickly, leading, almost instantaneously, to a dark red colored solution. At given time intervals aliquots of the metalated polymer solution are drawn and added swiftly to a 4–8 fold excess of TMSCl, stirred at room temperature. After 1 hour the reaction mixture is precipitated into 5 to 10 times its volume of acetone. The supernatant liquid is decanted and the remaining polymer is washed several times using methanol, before it is dried at 60° C. under vacuum for at least 24 hours.

METALATION EXAMPLES

The molar quantities given for the isobutylene-para-methylstyrene copolymer refers to the number of p-methylstyrene units present in the polymer. Reactions were carried out as described under General Procedure A. The time between addition of an alkyl lithium compound and TMSCl is 15 minutes if not stated otherwise. Work-up is described under General Procedure B, without extraction of the organic phase. The polymer products were dried at 60° C. under vacuum for at least 24 hours. Reactions carried out at times indicated as other than 15 minutes were carried out as described in General Procedure C.

Tables 1 and 2 below give a summary of the superbase reagents and reaction conditions of metalation as indicated by the silylation derivative. In the Tables "Eq"=molar equivalents used with regard to the number of p-methylstyrene units present in the copolymer isobutylene-para-methylstyrene; "benzylic/ring"=degree of silylation at the benzylic and ring position within the p-methyl styrene unit of copolymer; "RT"=room temperature. The degree of silylation at the benzylic/ring positions was determined by $^1$H-NMR and is the mole percentage of silylation at these sites based upon the mole content of the p-methyl styrene comonomer of the copolymer.

TABLE 1

| Alkyl Lithium (Eq)* | Alkoxide (Eq)* | Solvent T(°C.)/t(min) | Silylation (%) Benzylic/Ring |
|---|---|---|---|
| s-BuLi (1) | t-PeOK (1) | c-hexane RT/15 | 44/9 |
| s-BuLi (1) | t-PeOK (3) | c-hexane RT/15 | 59/5 |
| s-BuLi (1) | t-PeOK (10) | c-hexane RT/15 | 75/20 |
| s-BuLi (2) | t-PeOK (6) | n-hexane-78/120 | 70/22 |
| s-BuLi (2) | t-PeOK (6) | n-hexane--48/15 | 76/10 |
| s-BuLi (2) | t-PeOK (6) | n-hexane--48/263 | 77/12 |
| s-BuLi (2) | t-PeOK (6) | c-hexane RT/15 | 84/7 |
| s-BuLi (2) | t-PeOK (6) | c-hexane RT/1860 | 70/1 |
| s-BuLi (2) | t-PeOK (6) | c-hexane 65/15 | 79/3 |
| s-BuLi (2) | t-PeOK (6) | c-hexane 65/43 | 87/3 |
| s-BuLi (2) | t-PeOK (6) | c-hexane 70/10 | 52/12 |
| s-BuLi (1.1) | 1-MenONa (1.25) | c-hexane RT/15 | 5/0 |
| s-BuLi (1.1) | 1-MenOK (1.25) | c-hexane RT/15 | 36/4 |
| s-BuLi (1.1) | 1-MenOK (1.25) | c-hexane RT/1543 | 35/3 |
| s-BuLi (1.1) | 1-MenOCs (1.25) | c-hexane RT/15 | 71/1 |
| s-BuLi (1.1) | 1-MenOCs (1.25) | c-hexane RT/1534 | 50/3 |
| s-BuLi (2) | 1-MenOCs (2) | c-hexane RT/15 | 94/5 |
| s-BuLi (2) | 1-MenOCs (4) | c-hexane RT/15 | 88/3 |
| s-BuLi (2) | 1-MenOCs (6) | c-hexane RT/15 | 99/2 |

*Eq means molar equivalents emplyed with regards to the total number of p-methyl styrene units in the copolymer solutions.

Runs reported in Table 2 were carried out in accordance with General Procedures A and B except, as indicated, in some runs the superbase was supplemented with TMEDA or a Proton Sponge additive 1,8-bis(dimethylamino) naphthalene (Proton-sponge) which, in the quantities indicated, was added to the polymer solution at the time of alkali metal alkoxide addition.

TABLE 2

| Alkyl Lithium (Eq) | Alkoxide (Eq) | Additive (Eq) | Solvent T(°C.)/t(min) | Silylation (%) Benzyl/ic Ring |
|---|---|---|---|---|
| s-BuLi (2) | t-PeOK (6) | TMEDA (8) | c-hexane RT/15 | 79/27 |
| t-BuLi (2) | t-PeOK (6) | | c-hexane RT/15 | 68/10 |
| t-BuLi (2) | t-PeOK (6) | TMEDA (8) | c-hexane RT/15 | 70/8 |
| t-BuLi (2) | t-PeOK (6) | Proton Sponge | c-hexane RT/15 | 64/9 |

Example

An isobutylene-para-methylstyrene (0.32 g; 0.139 mmol para-methylstyrene/gram polymer) is dissolved in cyclohexane (3.5 ml). 8.3 ml (0.833 mmol) of freshly prepared, cesium 1-(−) menthoxide or potassium 1-(−) menthoxide (0.10 molar solution in cyclohexane) is added followed by 0.214 ml (0.278 mmol) is of s-BuLi (1.30 molar solution in hexane). The deep dark red solution is stirred for 15 minutes at room temperature and then quenched with a 4-fold excess of TMSCl. The quenched reaction mixture is stirred for 1 hour and then precipitated into 10 times its volume of isopropanol. The solvent is decanted, the remaining polymer is washed several times with methanol and finally dried at 60° C. under vacuum for at least 24 hours. The degree of silylation as determined by $^1$H-NMR is greater than 99% for the benzylic position and about 2% of silylation occurs on the aromatic ring of the p-methyl styrene group.

FUNCTIONALIZATION EXAMPLES

General Procedure D

Functionalization reactions using electrophiles other than TMSCl are carried out as described under General Procedure A, replacing TMSCl as indicated with a reactive electrophile. With regard to the number of p-methyl styrene units, 2 equivalents of a s-BuLi and 6 equivalents of t-PeOK are used as the metallating reagent. The metalation reaction is quenched after 15 minutes by using an excess of the indicated electrophile. In the case of electrophiles prone to side reactions (such as crosslinking) inverse addition of the metallated polymer solution into a solution of hydrocarbon and electrophile was preferred. Work up is described under General Procedure B. Deviations from this general procedure are stated individually in the preparation procedure it concerns.

Gaseous Formaldehyde

Pyrolysis of dried para-formaldehyde was carried out at about 130° C. in an inert atmosphere. The resulting gas was introduced to the solution of metallated polymer. Once the dark red color of the reaction mixture had faded to a yellow, the reaction was worked up as described. Yield: 70%.

This reaction was also carried out at elevated temperatures (40°–50° C.). Reduction of the amount of SB used (s-BuLi (1.1 Eq)/t-PeOK (1.5 Eq) is possible with little affect on the yield. Yield: 60%.

Paraformaldehyde

Para-formaldehyde was dried over $P_2O_5$ under reduced pressure. It was added to the solution of metallated polymer at room temperature upon which the dark red solution slowly turned yellow. After 1 hour the reaction mixture was worked up. Yield:40%.

Metalformaldehyde

Dried metalformaldehyde was added to a solution of metallated polymer. The dark red color turned to yellow within 10 minutes and the reaction was worked up after 1 hour. Yield: 57%.

Ethylene Oxide

Ethylene oxide was introduced as a gas to the solution of metallated polymer. The reaction took place immediately, changing the color of the dark red solution to yellow. Although an excess of ethylene oxide was used, chain propagation was not observed. Yield: 50–70%.

With replacement of the potassium pentoxide with cesium 1-(1)-menthoxide, chain propagation was observed. The yield, however, was not improved.

Crotonaldehyde

Freshly distilled crotonaldehyde was added dropwise to a solution of metallated polymer. After 1 hour the reaction mixture was worked up as described. Yield: 45%.

Citral

Freshly distilled citral was added dropwise to a solution of metallated polymer. After 1 hour the reaction mixture was worked up as described. Yield: 40%.

2.2.2-Trimethyl Acetaldehyde

Freshly distilled t-butyl aldehyde was added dropwise to a solution of metallated polymer. After 1 hour the reaction mixture was worked up as described. Potassium pentoxide was replaced by cesium 1-(−)-menthoxide in this reaction to study the effect of a chiral alkoxide on the reaction mechanism. Measurement of the optical rotation of the product showed a small but significant positive value. The optical rotation of the alkoxide solution is negative however. Hence chiral induction was observed. Yield: 70%

Terephthaldicarboxyaldehyde

A 12-fold excess of terephthaldicarboxy aldehyde was dissolved in a mixture of cyclohexane and THF (2:1 v/v). The metalated polymer solution was added dropwise at room temperature. The dark red color was quenched instantaneously. At the end of the addition the solution had acquired a reddish color. THF was added to form a clear solution before the reaction mixture was stirred overnight after adding aqueous HCl (10%). The rest of the work up is described in the General Procedure B. Yield: 15%. The treatment with acid lead to the elimination of water. Therefore the final product contained carboxyl substituted stilbene units.

Dimethylcarbonate

To neat, dried and distilled dimethyl carbonate was added dropwise and under vigorous stirring a solution of metalated polymer. The dark red color was quenched immediately, leading to a clear and yellow solution. After stirring continued at room temperature overnight, the reaction mixture was worked up as described under General Procedure B. In this particular case extractions with base were avoided. Yield: 23%

Carbon Dioxide

A solution of metalated polymer was transferred onto a large excess of solid carbon dioxide. The polymer solidified. Additional carbon dioxide was layered on top of the polymer before an equal volume of THF was added. Upon warming the dark red color of the polymer disappeared at the same rate as the polymer went into solution. The quenched reaction mixture was left stirring at room temperature overnight after aqueous HCl (10%) was used to obtain the carboxylic groups in their protonated state. The product was pure enough so that the functionaiized polymer could be dried without prior precipitation (yield=74%). A metalation was carried out with higher excess of superbase (PMS/s-BuLi/t-PeOK=1/4/7.3). The metalation was essentially completed with 2 minutes. The yield was high (94%) by reacting with carbon dioxide and no detectable ring carboxylation in the product.

Allyl Bromide

Freshly distilled allyl bromide was added dropwise to a solution of metalated polymer. Upon addition the dark red colored solution turned to yellow. Stirring was continued for 1 hour. Work up included precipitation, washing and drying (see General Procedure B). Yield: 40%

2-Chloroethyl Vinyl Ether

Freshly distilled 2-chloroethyl vinyl ether was added dropwise to a solution of metalated polymer. Upon addition the dark red solution turned yellow. Stirring was continued for 1 hour. Work up included precipitation, washing and drying (see General Procedure B. Yield: 50%

2,2,5,5-Tetramethyl-1-(3-chloropropyl)-1-aza-2.5-disilacyclopentane

The silane protected amine was distilled prior to use. It was dissolved in cyclohexane (about 0.60 molar) and added at room temperature to a solution of metalated polymer. The dark red color of the polymer solution was quenched instantaneously upon addition. After the addition the light yellow solution was stirred for 1 hour. One fifth of the solution volume was added as acetic acid (50% V/V) and the reaction mixture was heated to reflux for 1 hour. The milky solution was cooled to room temperature before it was extracted with isopropanol/aqueous KOH (about 1H; isopropanol/$H_2O$ 1:10 v:v). It was extracted further 6 times with isopropanol/$H_2O$ (1:1 v:v). The organic layer was concentrated and finally the polymer solution was precipitated into 5 times its volume of isopropanol. The polymer was washed with isopropanol several times. The primary amine functionalized polymer was dried under vacuum at 65° C. for at least 1 day. Yield: 70%.

Ethylene Sulfide

Freshly distilled ethylene sulfide was added dropwise to a solution of metalated polymer. The reaction took place immediately, indicated by a color change from dark red to a clear solution with a yellow touch. The reaction was quenched by using a 10-fold excess of methyl iodide after 1 hour. Stirring continues, first at room temperature, then followed by heating the solution to reflux for 3 hours. The reaction mixture was worked up as described under General Procedure B, except during the drying step at room temperature under vacuum the polymer crosslinked.

N,N-Dimethylformamide (DMF)

To a stirred emulsion of freshly distilled DMF in n-hexane at −78° C. a solution of metalated polymer (−78° C.) was added in a slow stream. The dark red color, characteristic of the metalated polymer, disappeared instantaneously upon addition. Vigorous stirring continued for 30 minutes before aqueous HCl (10%), about half the volume of the organic phase, was added. The stirred suspension was slowly warmed to room temperature. The aqueous phase was separated from the organic phase after 3 hours and a concentrated solution of the polymer in n-hexane was precipitated into acetone. The supernatant liquid was decanted afterwards and the methanol was used to wash the remaining polymer several times. The sample was dried at room temperature under vacuum for at least 24 hours. The dried polymer could not be redissolved into hydrocarbon solvents or THF. Metalation of Isobutylene-para-methylstyrene differed in this procedure compared to the one summarized under "General Preparation," in that only 1.25 Eq of s-BuLi and 1.50 Eq of t-PeOK were used.

1-Formyl Piperidine

Reaction conditions and observations are identical to the ones described for when DME is used as electrophile.

$D_2O$

A slight excess of $D_2O$ was added to the metalated polymer solution (PMS/s-BuLi/t-PeOK=1/1.5/3). The color of the solution changed from dark red to colorless. The deuterated copolymers was recovered with 70% yield.

We claim:

1. A method of introducing functionality into a copolymer of an isoolefin and an alkylstyrene at the alkylbenzyl carbon atom comprising the steps of:

forming a solution of said copolymer in a hydrocarbon solvent; adding to said polymer solution an alkali metal Cs, K, Na alkoxide and an alkyl lithium compound to form a superbase with the polymer solution; and adding an electrophile to said base polymer solution.

2. The method of claim 1, wherein the superbase is present in an amount relative to the alkylstyrene content of the copolymer to provide a mole ratio of from about 1:1 to about 2:1.

3. The method of claim 1 wherein the alkali metal alkoxide and alkyl lithium are added sequentially.

4. The method of claim 1 wherein the alkali metal alkoxide and alkyl lithium are first reacted to provide superbase and the superbase is added to the polymer solution.

5. The method of claim 1, wherein the alkali metal alkoxide is an alkoxide of cesium or potassium.

6. The method of claim 5, wherein the alkali metal alkoxide is an alkoxide of cesium.

7. The method of claim 5, wherein the alkyl lithium compound is a secondary alkyl lithium compound.

8. The method of claim 7, wherein the alkyl lithium compound is sec-butyl lithium.

9. The method of claim 1 wherein the alkylstyrene is p-alkylstyrene.

10. The method of claim 1 wherein the p-alkylstyrene is p-methylstyrene.

11. The method of claim 1, wherein the copolymer is an isobutylene-para-methylstyrene copolymer.

12. The method of claim 1, wherein the electrophile is selected from the group consisting of acyl chlorides, $CO_2$, $CS_2$, aliphatic chlorides, benzylic chlorides, allylic chlorides, fluoroaromatics substituted with an electron withdrawing group, silylchloride, aldehydes, ketones, carbonates, esters and anhydrides.

* * * * *